United States Patent [19]

Cheng

[11] Patent Number: 4,663,110

[45] Date of Patent: May 5, 1987

[54] FUSION BLANKET AND METHOD FOR PRODUCING DIRECTLY FABRICABLE FISSILE FUEL

[75] Inventor: Edward T. Cheng, Del Mar, Calif.

[73] Assignee: GA Technologies Inc., San Diego, Calif.

[21] Appl. No.: 736,962

[22] Filed: May 21, 1985

Related U.S. Application Data

[62] Division of Ser. No. 357,632, Mar. 12, 1982, abandoned.

[51] Int. Cl.$^4$ .............................................. G21B 1/00
[52] U.S. Cl. .................................. 376/146; 376/181; 376/182; 376/267
[58] Field of Search ............... 376/146, 171, 172, 181, 376/182, 267

[56] References Cited

U.S. PATENT DOCUMENTS

| 2,982,708 | 5/1961 | Abraham et al. | 376/356 |
| 3,152,958 | 10/1964 | Allen | 376/146 |
| 3,336,201 | 8/1967 | Graham et al. | 376/267 |
| 3,669,832 | 6/1972 | Boettcher | 176/68 |
| 3,708,391 | 1/1973 | Christofiolos | 176/4 |
| 3,791,921 | 2/1974 | Stanton | 176/17 |
| 4,121,969 | 10/1978 | Marwick | 176/18 |
| 4,121,971 | 10/1978 | Marwick | 176/39 |
| 4,199,404 | 4/1980 | Mordarski et al. | 376/172 |
| 4,216,058 | 8/1980 | Marwick | 176/39 |
| 4,430,291 | 2/1984 | Chi | 376/146 |

FOREIGN PATENT DOCUMENTS

| 2483673 | 12/1981 | France | 376/267 |
| 924235 | 4/1963 | United Kingdom | 376/356 |

OTHER PUBLICATIONS

Nuclear Technology, vol. 49, 8/80, pp. 458–468, Conn et al.
Conf-760935-P1, vol. 1, Sep. 21-23, 1976, Richland, Washington, Sze et al., pp. 1501-1511.
Nuclear Technology, vol. 28, 1/76, pp. 98-107, Maniscalco.
J. of Fusion Energy, vol. 1, No. 3, 1981, pp. 285-298, Ragheb; pp. 299-303, Lee et al.
Nuclear Technology, vol. 44, Aug. 1979, Avci et al., pp. 333-345.
Nuclear Technology/Fusion, vol. 3, 5/83, pp. 385-391, Kulcinski et al.
UWFDM-426, 8/81, Kulcinski et al.
Nuclear Science & Eng. vol. 71, pp. 200-211, 1963, Powers et al.
Nuclear Fusion, Special Suppl. 1974, pp. 27-43, Sako et al.
Nuclear Fusion, vol. 15, 1975, Lidsky, pp. 151, 165.
Nuclear Technology, vol. 42, No. 1, vol. 79, pp. 34-50, Berwald et al.
R. W. Conn et al., "Fusion-Fission Hybrid Design with Analysis of Direct Enrichment and Non-Proliferation Features (the Solase-H Study)," *Nuclear Engineering and Design* 63 (1981) pp. 357-374.

Primary Examiner—Harvey E. Behrend
Attorney, Agent, or Firm—Fitch, Even, Tabin & Flannery

[57] ABSTRACT

A fusion blanket includes a chamber wall, a multiplication section, an enrichment section and a reflector in radially outward succession, respectively. The chamber wall isolates the fusion reaction chamber from the remainder of the blanket. Fusion neutrons bombard atoms in the multiplication section to free further neutrons which are then available for breeding fuel. The enrichment section contains fertile fuel of sufficient dilution to maximize the enrichment rate and minimize fast fission. Materials may be included in the multiplication section and the enrichment section to reduce thermal neutron flux, thereby suppressing thermal fission. Additionally, tritium may be bred in both sections. The fertile material is exposed to neutron bombardment until the desired enrichment is achieved. The particles may be removed and mixed to minimize nonuniformities in enrichment. The particles may then be fabricated into fuel elements for fission reactors.

2 Claims, 2 Drawing Figures

FUSION BLANKET AND METHOD FOR PRODUCING DIRECTLY FABRICABLE FISSILE FUEL

This application is a division of application Ser. No. 357,632 filed Mar. 12, 1982, now abandoned.

BACKGROUND OF THE INVENTION

The present invention relates to the production of fissile fuel for fission reactors, and in particular to the breeding of such fuels using the neutrons generated by a fusion reactor Fertile materials such as thorium 232 ($^{232}$TH) and uranium 238 ($^{238}$U) may be bombarded by neutrons to produce fissile materials such as uranium 233 ($^{233}$U) and plutonium 239 ($^{239}$Pu), respectively. A "fissile" material is one which is fissionable by slow neutron capture, and a "fertile" material is one which can be rendered fissile by neutron absorption. The source of the neutrons may be a fusion reactor. The fusion breeder concept is attractive because the subsequent burning of a bred fissile atom releases 200 MeV as compared to the 20 MeV typically produced by a single fusion reaction.

Generally, the fusion neutron enriched fuel must be chemically reprocessed so that the concentration of fissile fuel is sufficient for fabrication of the fuel elements (blocks, control rods, pins, etc) which are to be inserted into a fission reactor. Reprocessing is subject to certain dangers which are the focus of resistance to the development of nuclear reactors. Not the least objectionable aspect of reprocessing are the opportunities provided for diversion of materials which could be used to manufacture a nuclear explosive device. Reprocessing is also expensive, adding up to $50 per gram or more to the cost of the bred fuel.

In part to circumvent such problems, it has been proposed to bypass reprocessing by breeding fuel within assembled fuel elements, pins and rods inserted into the blanket of a fusion reactor. The problems introduced by this approach include thermal and radiation damage to structural material of the fuel element Additionally, since the neutron flux is not generally uniform throughout the fusion blanket, the eventual fuel elements contain variably enriched fuel.

The relatively long residence time required adversely affects the materials and economics involved. For example, in one approach the calculated residence time is on the order of 2.6 years. Furthermore, approximately 11-12% of the $^{233}$U bred in the blanket is burned up before 4% enrichment is achieved. [R. W. Conn, S. I. Abdel-Khalik, G. A. Moses, G. L. Kulcinski, E. Larsen, C. W. Maynard, M. M. H. Ragheb, I. N. Sviatoslavsky, W. F. Vogelsang, W. G. Wolfer, M. Ortman, R. Watson and M. Z. Youssef, "Fusion-Fission Hybrid Design with Analysis of Direct Enrichment and Non-Proliferation Features (The Solase-H Study)", *Nuclear Engineering and Design*, 63 (1981) pp. 357-374.]

Accordingly, it is an object of the present invention to provide a method for enriching fertile material using a fusion reactor, which method does not require chemical reprocessing, provides for uniformity of enrichment, and does not damage the structural components of the fuel elements. It is also an object of the invention to provide for a shortened residence time of the fission fuel in the fusion blanket.

SUMMARY OF THE INVENTION

A fusion blanket and method permit the breeding of fissile material which may be fabricated for use as fuel in a fission reactor. The blanket includes a chamber wall for isolating the fusion chamber from the rest of the blanket, a neutron multiplication section, an enrichment section and a reflector, in radially outward succession, respectively. The neutron multiplication section includes a material which may produce about two neutrons upon bombardment by one neutron of high energy. The reflector reflects neutrons back through the enrichment section to increase the efficiency of the enrichment process.

The enrichment section includes fertile material, which is relatively dilute so as to limit fissioning and undue competition among fertile atoms for enriching neutrons. The enrichment section provides material capable of absorbing thermal neutrons in order to repress thermal fissioning of the bred fissile material. The amount of thermal neutron absorbing material is preferably selected to limit the thermal neutron flux without excessively competing with the fertile material for enriching neutrons.

In a first preferred embodiment, the particles are packed into chambers extending through the enrichment section of the fusion blanket. In a second preferred embodiment, the particles are suspended in a slurry flowing through pipes in the enrichment section. The slurry includes a carrier which is preferably a good thermal conductor and thermal neutron absorber. Such a carrier promotes effective heat transfer while suppressing thermal fissioning of the bred fissile atoms.

In accordance with the present method, particles of fertile material are included in the blanket of a fusion reactor. The particles may be packed in chambers or suspended in a slurry which flows through pipes extending through the blanket The particles are exposed to neutrons produced directly and indirectly through the fusion process until the desired level of enrichment is achieved. The enriched particles are removed from the blanket, any carrier being removed at this point.

The particles are then mixed to compensate for nonuniformities, such as those introduced as a function of particle location within the blanket. The mixing may be random or systematic, provided the enrichment profile of the blanket is known. If the enrichment profile of the blanket is known, the particles may then be collected and grouped according to location within the reactor so that the groups formed have different average enrichments. The particles within each group may then be mixed to obtain within-group uniformity. This grouping method is applicable where more than one level of enrichment is desired. For example, fuel may be bred for two different types of fission reactors, or for different elements of a single reactor, such as fuel blocks and control rods in a high-temperature gas-cooled reactor (HTGR). The enriched material is then inserted and/or fabricated into fuel elements, such as fuel blocks, fuel pins, or control rods, as required by the fission reactors to be supported by the fusion reactor. The fuel elements then may be used in the fission reactors to generate power.

Since the fuel elements' structural members (cladding, hexblocks, graphite matrices, etc.) are not included in the blanket, irradiation damage is minimized. Furthermore, the power swing in the present design is limited by the low concentration of fertile fuel and the relatively short fertile residence time. The limited power swing reduces materials demands in the blanket, lowering the probability of blanket failure. No separate reprocessing step is required, thus the opportunities for diversion are limited. Should reprocessing be deemed desirable, recovery of residual fissile material from the spent fuel may be added, thereby greatly increasing the number of fission reactors which may be supplied by a fusion reactor of equal power.

DESCRIPTION OF THE PREFERRED EMBODIMENTS

Figure 1:
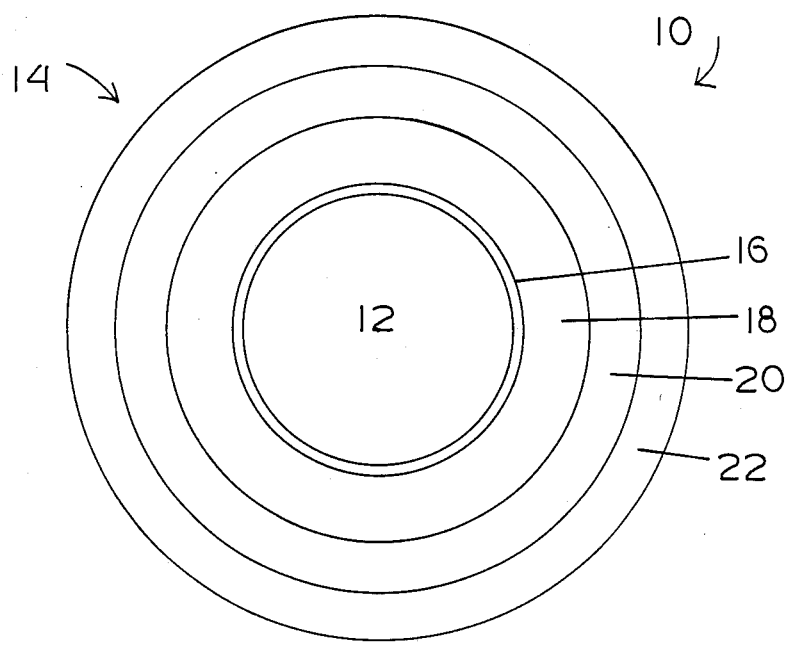
FIG. 1 is a simplified transaxial cross-sectional view of a fusion reaction chamber and a fusion blanket suitable for practicing the present invention.

A fusion reactor 10, illustrated in FIG. 1, includes a fusion chamber 12 and a blanket 14 permitting the breeding of fissile material which may be fabricated for use in a fission reactor. The blanket 14 includes a chamber wall 16 for isolating the fusion chamber 12 from the rest of the blanket 14, a neutron multiplication section 18, an enrichment section 20, and a reflector 22, in radially outward succession, respectively. The neutron multiplication section 18 includes a material which may produce about two neutrons upon bombardment by one neutron of high energy. The reflector 22 reflects neutrons back through the enrichment section 20 to increase the efficiency of the enrichment process.

The enrichment section 20 includes fertile material, which is relatively dilute so as to limit fissioning and undue competition between fertile atoms for enriching neutrons. The enrichment section 20 also provides material capable of absorbing thermal neutrons in order to repress thermal fissioning of the bred fissile fuel. The amount of thermal neutron absorbing material is preferably selected to limit the thermal neutron flux without excessively competing with the fertile material for enriching neutrons.

In accordance with the method of the present invention, fertile material is formed into particles, such as powder or pellets, and inserted into the enrichment section 20 of the fusion blanket 14. The particles may or may not be suspended in a slurry. The particles are exposed to neutrons produced directly and indirectly by the fusion process until the desired level of enrichment is achieved. The particles are then removed from the blanket 14, and any slurry carrier is removed. The particles may then be mixed to reduce or eliminate undesired nonuniformities in fissile enrichment. The fuel particles are then fabricated into appropriate form for use in fission reactors.

The opportunities for diversion of weapons suitable fuel are minimized through such a method. Only fertile material would be fed into a fusion hybrid breeder and the bred fissile material would have a high content of fission products that would never be removed from the fuel, as it would never be reprocessed. These fission products would protect the bred fuel from diversion just as fission products currently protect spent fuel of a light water reactor (LWR) from diversion during shipping and storage.

Should reprocessing be acceptable, the spent fuel element may be reprocessed to produce further fissile fuel for refabrication of a fuel element and/or further fertile material for further enrichment in the fusion blanket 14. Waste products of the reprocessing must then be properly disposed of.

Describing the preferred fusion reactor 10 in greater detail, the fusion reactor 10 includes a chamber 12, which may be a plasma/vacuum chamber, wherein the fusion reaction takes place. The preferred reactor 10 is of the deuterium-tritium (D-T) fusion type. The fusion blanket 14 provides a chamber wall 16 for isolating the fusion chamber 12 from the remainder of the blanket 14. The blanket 14 includes four sections, a fusion chamber wall 16, a neutron multiplication section 18, an enrichment section, and a reflector 22.

The chamber wall 16 serves to isolate the fusion chamber 12 from the remainder of the fusion blanket 14. The chamber wall 16 may also serve to contain the neutron multiplication material of the neutron multiplication region 18, where the material chosen achieves a liquid state during reactor operation. The preferred material for the chamber wall 16 is steel. In the illustrated embodiment, the chamber wall 16 has a diameter of about 4 m and is about 5 mm thick.

Only one neutron is released per deuterium-tritium (D-T) reaction. The number of fusion neutrons would not suffice to breed fissile fuel efficiently, especially where it is expected that the fusion reactor 10 also breed enough tritium to be self-sustaining. The neutron multiplication section 18 serves to increase the number of neutrons available for breeding. By including a material which when bombarded by fusion neutrons produces two or more neutrons, there may be provided ample neutron bombardment for breeding both fissile and fusile materials.

In addition, a fusion neutron has a very high energy of about 14.1 MeV, sufficient to induce direct fissioning of the fertile material. The direct fissioning of the fertile material spoils an enrichment opportunity and increases the actinide inventories of the eventual fuel particles. Accordingly, the neutron multiplication section 18 also serves to provide neutrons at more moderate energy levels so that direct fissioning is relatively infrequent.

The multiplication section 18 may serve additional functions as well. A thermal neutron absorbing material may be included to reduce the number of thermal neutrons entering the enrichment section 20 and inducing thermal fissioning of bred fissile fuel. Tritium is bred by bombarding lithium with neutrons. Additionally, tritium may be bred in this section for recycling into the fusion reactor 10. Furthermore, heat generated in the multiplication section 18 must be transferred to cool the blanket 14 and provide energy to some destination.

In the preferred embodiment, the multiplication section is primary of a lithium lead eutectic, such as $Li_{17}Pb_{83}$. Structural components may be of ferritic steel. The $Li_{17}Pb_{83}$ serves the functions described above. The lead, by way of Pb(n,2n) reactions serves as a neutron multiplier and a moderator of the very fast fusion neutrons. The lithium serves as tritium breeding material and as an absorber of thermal neutrons. Of course, the lithium may also moderate fast neutrons as well.

$Li_{17}Pb_{83}$ is a liquid at the operating temperatures of the fusion reactor 10 and thus serve as a coolant which is circulated to transfer heat from the blanket 14. In an embodiment in which the multiplier is solid, coolant pipes of ferritic steel could be incorporated as coolant passageways through which fluid coolant flows and transfer heat from the fusion blanket 14.

Natural lithium is primarily $^7$Li, with about 7.4% $^6$Li. Inelastic scattering of $^7$Li by fusion neutrons, or other neutrons above 2.5 MeV, can result in their moderation and tritium production. However, the $^6$Li is the more active isotope in the context of the fusion reactor 10. The absorption of thermal neutrons by the $^6$Li isotope causes the isotope to break up into helium ($^4$He) with an energy of 2.0 MeV and tritons ($^3$H) with an energy of about 2.8 MeV. Upon capturing an electron, a triton becomes a tritium atom. In absorbing thermal neutrons, lithium also serves to limit the thermal flux in the adjacent enrichment section 20.

The enrichment section 20 is designed to produce fissile atoms at an efficient enrichment rate, and to suppress thermal fissioning of the bred fissile atoms. The enrichment section 20 includes structural metal, material for moderating thermal neutrons— and preferably for breeding tritium and fertile material. The fertile material may be $^{232}$Th and/or $^{238}$U. $^{232}$Th may absorb a neutron to produce $^{233}$U, a fissile material. $^{238}$U may absorb a neutron to produce $^{239}$Pu, also fissile. Various transuranic compounds may also be suitable fertile materials. The advantage of the thorium-uranium cycle is that $^{232}$Th is less prone to direct fissioning than $^{238}$U. Direct fissioning results in undesired actinide production while bypassing the production of a fissile atom. In the illustrated embodiment, $^{232}$Th in its oxide form, ThO$_2$, is employed as the fertile material. Preferably the ThO$_2$ is in the form of ThO$_2$ particles.

The quantity of fertile material must be ample to support an appropriate ratio of fission to fusion reactors, and low enough so that competition among the fertile atoms does not unduly lengthen the time required for the target enrichment level. Since the enrichment rate is inversely proportional to the blanket 14 fertile inventory, the fertile residence time needed to achieve a given enrichment can be drastically reduced if the blanket fertile inventory is kept a minimum. A shorter residence time translates into a quicker fuel turnover, which is favorable from an economic standpoint.

In the illustrated blanket 14, the enrichment section 20 includes between about 2% and about 3% ThO$_2$. Preferably the concentration of ThO$_2$ should be about 2.5%. The preferred concentration provides sufficient fuel to support about two HTGR's of power equal to that of the illustrated fusion reactor.

If instead of ThO$_2$, UO$_2$ is used as the fertile material, we would need only about one-half or one-third as much fertile material in the blanket 14. The neutron capture cross section for uranium is about three times that of thorium. This results in about a two thirds reduction in residence time. Thus the quantity of UO$_2$ may be between 0.5% and 1.5% of the enrichment section 20. Preferably, the quantity of UO$_2$ is about 0.8% of the enrichment section 20.

The enrichment section 20 contains thermal neutron moderating material, preferably one containing $^6$Li. The $^6$Li serves the same functions in the enrichment section 20 as it does in the multiplication section 18. However, the moderation of the thermal flux is more critical in the enrichment section 20 due to the proximity of the fertile particles. Conversely, the tritium breeding function is of lesser importance. The quantity of $^6$Li atoms should be adequate to moderate the thermal flux, and yet be slight enough not to compete unduly with the fertile particles for epithermal neutrons. Preferably the mean lithium concentration in the enrichment section 20 is on the order of $4 \times 10^{20}$ atoms per cc.

Note that fission suppression is achieved by: (1) the low level of fertile material in the blanket 14; (2) the presence of a neutron energy moderating material in the multiplication section 18, between the fusion chamber 12 and the fertile material to suppress fast fissioning of the fertile atoms; and (3) mixing the fertile particles with 1/v neutron absorbing materials, such as lithium compounds, to reduce the thermal fissioning of the accumulated bred fissile atoms. Among the advantages of this fission-suppressed aspect of the present invention are very low fission product and actinide inventories, and minimum thermal power swing during enrichment.

The $^6$Li level in the lithium-lead compound is adjusted to about 1% of the enrichment section 20 to allow production of sufficient tritium, while not competing too severely with the $^{232}$Th for neutrons. The $^6$Li suppresses the thermal flux which would otherwise burn out the bred fuel.

The $^6$Li may conveniently be included as a minority isotope in a lithium containing material. The concentration of $^6$Li may be determined by the amount of lithium containing material in the enrichment section 20 and by the density of lithium in the lithium containing material. Furthermore, the $^6$Li level in the lithium may be adjusted to effect the desired degree of suppression of the thermal flux. Where practical, it is preferable to adjust the $^6$Li level in the enrichment section 20 during the residence of the fertile material in the fusion reactor 10. By having negligible $^6$Li at the inception of the residence, a maximal number of neutrons is made available for enrichment. As fissile material is produced and the need for moderation of the thermal flux increases, $^6$Li may be added gradually.

Thermal hydraulic or other considerations may dictate that the enrichment section 20 is not filled by fertile fuel, lithium material and structural metal. Accordingly, it may be advantageous to include other material, such as graphite and/or silicon carbide in the enrichment section 20. Means for transferring heat from the enrichment section 20 must also be provided.

The particles of fertile fuel may be packed in breeding chambers in the enrichment section 20 or suspended in a slurry circulated in pipes extending through the enrichment section 20. In the first, or "dry" embodiment, breeding chambers may extend vertically from the top to adjacent the bottom of the radial portion of the fusion blanket 14. The breeding chambers are formed in solid material of the enrichment section 20 which may include graphite and/or silicon carbide. The breeding chambers may extend vertically through the enrichment section 20, and may have diameters about 2 cm.

Preferably, the enrichment section 20 includes a lithium material, such as Li$_7$Pb$_2$, LiAlO$_2$, Li$_2$O, and mixtures thereof, which remains solid at fusion blanket operating temperatures. Li$_7$Pb$_2$ is preferred because the lead serves to supplement the neutron multiplication collected in the multiplication section 18. Lithium aluminate, LiAlO$_2$, is advantageous because of its high melting point. Lithium oxide, Li$_2$O, is advantageous because it is a dense lithium containing compound. LiO$_2$ might be used in designs where it is desired to maximize the amount of graphite or silicon carbide in the enrichment section 20. More graphite or silicon carbide might be required by neutron moderation and thermal hydraulic or heat transfer considerations.

To recover bred tritium in the first preferred embodiment, fluid, such as helium, may flow through pellets of the lithium containing material to collect the tritium. This process may be facilitated by forming holes in the pellets through which the collector fluid flows. The collector fluid preferably flows more slowly than the coolant fluid.

In the first embodiment, the fuel particles may be enriched to the level required for operation of an HTGR, which may be about 4%. The duration of the enrichment process is a function of the power output of the fusion reactor 10. If the illustrated fusion reactor 10 produces a 4 MW/m$^2$ neutron loading at the chamber wall 16, known methods of calculation suggest that about 2 months of residence time will be required for each percent of enrichment. Accordingly, about eight months are required to achieve the target 4% enrichment level.

After enrichment, the fusion reactor 10 may be shut down and the fuel particles removed. The removed particles may be mixed to compensate for nonuniformities in enrichment introduced as a function of location of particles within the enrichment section 20. The mixing may be random or systematic, where the enrichment distribution is established.

The removal of fuel particles from the fusion blanket 14 may be effected by blowing the particles out by gas injection or by mechanical means. Alternatively, the fuel particles may be included within a liner which is inserted into the breeding chambers of the blanket 14. After enrichment, the liner may be removed along with the contained fuel particles. The liner may be of steel, such as stainless steel.

Where the enrichment profile is known, the fuel particles may be collected in two or more aggregates with different average enrichments. The particles within each aggregate may then be mixed so that the enrichment is uniform within each aggregate. This technique may be used where different enrichment levels are required for different fission reactors, or different components in a single fission reactor.

In some HTGRs, for example, the fuel in the control rods must be more highly enriched than the fuel in the fuel blocks. In these cases, the fuel for the control rods may be collected from a relatively high enrichment region of the enrichment section 20 and the fuel for the fuel blocks from a relatively low enrichment region of the enrichment section 20. The fuel collected from the relatively high enrichment region may be mixed and then imbedded into graphite matrices to fabricate fuel rods. The fuel collected from the relatively low enrichment region may be randomly mixed and inserted into the breeding chambers of the fuel blocks.

In the second preferred or "wet" embodiment, the fertile particles may be suspended in a carrier fluid such as $Li_{17}Pb_{83}$ eutectic, which has a melting point of about 235° C. The $Li_{17}Pb_{83}$ may also serve as the coolant for the enrichment section 20. The $Li_{17}Pb_{83}$ is a preferred carrier because it has a density comparable to that of $ThO_2$, so that the particles are more evenly distributed throughout the slurry. The $^6Li$ in the slurry helps moderate the thermal flux and suppress thermal fission. The advantage of having a liquid carrier for the particles is that the void spaces are filled between the particles and where the liquid is a conductor, like $Li_{17}Pb_{83}$, heat transfer to the walls of pipes carrying the slurry is facilitated. Thus hot spots may be alleviated and the maximum reactor temperatures lowered to reduce materials stresses and other reactor design problems.

$Li_{17}Pb_{83}$ may be circulated out of the normal coolant passageways, to allow recovery of the bred tritium. The amount diverted to recovery may be about 1% to 2% of the total flow. The diversion permits a small quantity of fluid to flow slowly enough for the recovery process to be effectuated. The amount of coolant is determined by thermal hyrdraulic considerations.

Outside the pipes, the bulk of the enrichment section 20 may also be $Li_{17}Pb_{83}$. The enrichment section may also include solid moderating material such as silicon carbide or graphite. Silicon carbide is preferred over graphite, which reacts with $Li_{17}Pb_{83}$ at temperatures above 500° C., whereas silicon carbide is relatively inert below 800° C.

In the second preferred embodiment, the $^6Li$ level may be adjusted as the $Li_{17}Pb_{83}$ circulates. Thus, the $^6Li$ concentration may be negligible at the onset of enrichment so as not to compete with the fertile material for thermal neutrons. As the fissile material content increases as a function of the enrichment of the fertile material, more $^6Li$ lithium may be added gradually to suppress thermal fissioning of the fissile fuel.

In the second embodiment, the fuel particles may be enriched to a level suited to a LWR, such as a 3.3% enrichment level, equal to 3% enrichment plus another 10% to compensate for the effect of poisons in the LWR. Accordingly, a residence time of about 6.6 months would be appropriate in the second preferred embodiment.

Once the desired enrichment level is achieved, the slurry may be removed from the blanket pipes. The bulk of the carrier may be strained away. Nitric acid may be used to clean the particles of the remaining eutectic. The particles may then be mixed, randomly or systematically, to achieve uniformity. The particles may then be fabricated into fuel elements such as fuel pins for a LWR.

While the first embodiment is described as producing fuel for an HTGR and the second embodiment is described as producing fuel for a LWR, either embodiment could be adapted for breeding fuel for a variety of fission reactors. The embodiments may have similar chamber walls, multiplication sections and reflectors. The preferred dimensions, common to both embodiments are: the diameter of the chamber wall 16 is about 4 m; the thickness of the chamber wall 16 is about 5 mm; the thickness of the multiplication section 18 is about 0.4 m; the thickness of the enrichment section 20 is about 0.3 m; and the thickness of the reflector 22 is about 0.3 m.

The neutronics performance of the wet and dry embodiments with the dimensions as described above is summarized in Table I. The results of the neutronics calculations are given in this table for the blankets when the $^{233}U$ enrichments are 0%, 2% and 4%.

TABLE I

| SUMMARY OF NEUTRONICS PERFORMANCE | | |
|---|---|---|
| | $^{233}U$ Enrichment | |
| Beginning of Life 0% | 2% | End of Life 4% |
| $^6Li(n,\alpha)$ T (T$^6$) | | |
| multiplication section   0.6342 | 0.6474 | 0.6608 |
| enrichment section   0.4076 | 0.4181 | 0.4304 |
| Total   1.0418 | 1.0655 | 1.0912 |

TABLE I-continued
SUMMARY OF NEUTRONICS PERFORMANCE

| | $^{233}$U Enrichment | | |
|---|---|---|---|
| | Beginning of Life 0% | 2% | End of Life 4% |
| $^7$Li(n,n'$\alpha$) T (T$_7$) | | | |
| multiplication section | 0.02416 | 0.02418 | 0.02419 |
| enrichment section | 0.00316 | 0.00370 | 0.00428 |
| Total | 0.02732 | 0.02788 | 0.02847 |
| Total T$_6$ + T$_7$ | 1.0691 | 1.0934 | 1.1197 |
| $^{233}$U Production (U/n) | 0.4082 | 0.4221 | 0.4365 |
| $^{233}$U(n,f) (fission/n) | 0.0 | 0.0459 | 0.0953 |
| Net $^{233}$U Production | 0.4082 | 0.3762 | 0.3412 |
| Blanket Energy Multiplication | 1.20 | 1.78 | 2.42 |
| Other Reactions (R/n) | | | |
| Pb(n,2n) | 0.6751 | 0.6752 | 0.6752 |
| Fe(n,$\gamma$) | 0.1140 | 0.1170 | 0.1202 |
| Th(n,2n) | $4.15 \times 10^{-4}$ | $4.17 \times 10^{-4}$ | $4.20 \times 10^{-4}$ |
| Th(n,3n) | $8.79 \times 10^{-5}$ | $8.61 \times 10^{-5}$ | $8.45 \times 10^{-5}$ |
| Th(n,f) | $2.27 \times 10^{-4}$ | $3.20 \times 10^{-4}$ | $4.17 \times 10^{-4}$ |
| $^{233}$U(n,2n) | 0.0 | $2.77 \times 10^{-6}$ | $5.79 \times 10^{-6}$ |
| $^{233}$U(n,3n) | 0.0 | $1.21 \times 10^{-7}$ | $2.42 \times 10^{-7}$ |
| $^{233}$U(n,$\gamma$) | 0.0 | $6.51 \times 10^{-3}$ | 0.0134 |

As shown in Table I, the net $^{233}$U production rate is 0.4082 when the blanket 14 is fresh, and drops to 0.3762 and 0.3412 when the blanket 14 is enriched with 2% and 4% $^{233}$U, respectively. The reduction of the $^{233}$U production rate at the end of the blanket exposure, i.e., 4% $^{233}$U enrichment, is about 16%. The tritium breeding ratio increases from 1.0691 to 1.1197 when the blanket 14 is at fresh and 4% $^{233}$U enrichment, respectively. This demonstrates that adequate tritium regeneration, an average of about 1.1 tritons per D-T neutron, can be obtained by the blanket design.

The blanket energy multiplication, which is the ratio of the blanket total nuclear heating to the fusion neutron energy, is 1.20 at the beginning of blanket life. It increases to 1.78 and 2.42 when the $^{233}$U enrichment in the blanket 14 reaches 2% and 4%, respectively. The increase of the blanket energy multiplication is due solely to the fissioning induced in the accumulated $^{233}$U in the blanket 14. The increase at 4% $^{233}$U enrichment from the multiplication at the beginning of blanket life is about 100%. However, this thermal heat swing is modest compared to that of a fast-fission hybrid blanket, and is manageable without much effort in the blanket thermal design.

Also shown in Table I are the reaction rates for several important nuclear reactions such as Pb(n,2n), Th(n,2n), and Th(n,3n). The Th(n,2n), Th(n,3n) and Th(n,f) reaction rates, $4.15 \times 10^{-4}$, $8.79 \times 10^{-5}$ and $2.27 \times 10^{-4}$, respectively, per D-T neutron, are very small. The Th(n,f) reaction rate increases with the increase of $^{233}$U enrichment in thorium, and is about twice that at fresh, when the blanket 14 reaches 4% $^{233}$U enrichment. However, the contribution of the Th(n,f) reaction to the blanket energy multiplication is so small, less than 0.2%, that it can be ignored. These low actinide production and thorium fission rates are basically due to the dilution of the thorium inventory and the suppression of the high-energy neutrons in the blanket design. However, because of the reduction of the thorium inventory, the relative concentrations of the actinide elements in the thorium or bred uranium are not so significantly reduced.

The $^{232}$U concentration in the bred $^{233}$U at 4% $^{233}$U enrichment is estimated to be about 130 ppm, which is about two orders of magnitude lower than in a typical fast-fission blanket. The concentrations of other possible uranium isotopes, such as $^{234}$U, are much lower than the $^{232}$U concentration. Hence, production of very high quality fissile fuel can be expected in the illustrated blanket 14. The average $^{233}$U production in the illustrated blanket 14 is about 0.38 U/n.

Figure 2:
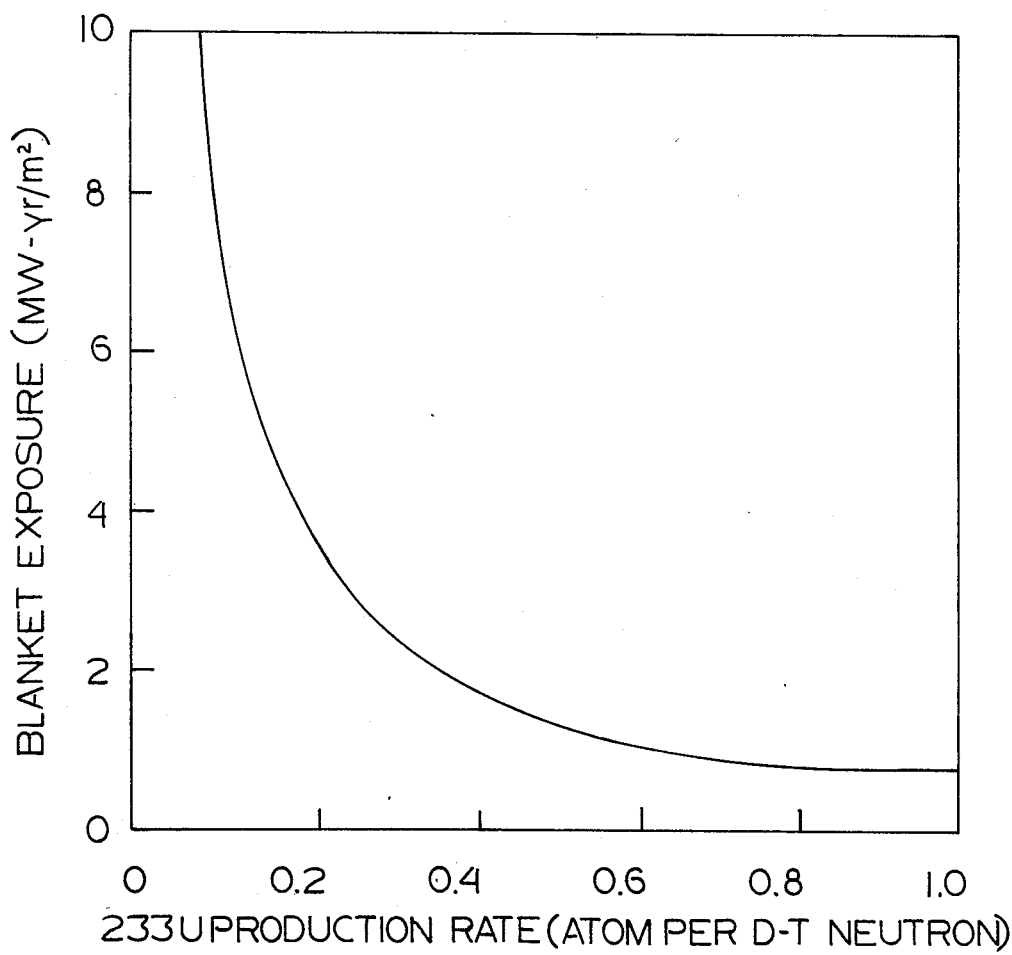
FIG. 2 depicts the blanket exposure required to reach a 4% enrichment in thorium as a function of $^{233}U$ production rate.

FIG. 2 depicts the blanket exposures (MW-yr/m$^2$) required to reach 4% $^{233}$U enrichment in thorium as a function of the $^{233}$U production rate, and may be used to calculate the necessary residence times for fertile fuel. Given a neutron wall loading of about 4.0 MW/m$^2$, the residence time of the blanket 14 in the reactor 10 is about eight months, which is significantly shorter than the residence times required in most hybrid blanket designs.

Without reprocessing, one fusion reactor can support about two fission reactors of power equal to that of the fusion reactor. With reprocessing, ten to twenty fission reactors may be supported, depending upon design. The higher numbers may be obtained where the fission reactor is itself a breeder.

Should reprocessing be acceptable, the spent fuel element may be reprocessed to produce further fissile fuel for refabrication of a fuel element and/or further fertile material for further enrichment in the fusion blanket 14. Waste products of the reprocessing must then be properly disposed of.

In accordance with the above, an improved method of breeding fissile fuel and a fusion blanket for practicing the method are provided. Among the advantages of the present invention are the following. No reprocessing is needed, thus easing the potential political complications of the fusion-fission hybrid reactor development, and the fuel production cost will be lower than when reprocessing is required. Reprocessing of the spent fuel may be added at a later date. A relatively short fertile residence time is required, so that the probability of blanket failure is reduced, materials requirements for the blanket are relaxed, and fuel turnover time is lessened. The thermal power swing is maintained within a factor of about two, well within the capabilities of the materials incorporated in the inventive blanket design. The fission-suppressed blanket design is used to maintain a high enriching rate, low fission product and actinide inventories, and modest thermal power swing during enrichment. Tritium is produced for refueling the fusion reactor 10. The above and other embodiments are within the spirit and scope of the present invention.

What is claimed is:

1. A method of making fuel elements for a fission reactor by breeding fissile fuel in a tritium breeding fusion reactor having a blanket with an enrichment section comprising the following steps:
   (a) incorporating particles of fertile material and particles of a thermal neutron absorber into said enrichment section in such proportion that said particles of fertile maeterial make up less than 3% by volume of said enrichment section, said thermal neutron absorber functioning at least in part to suppress thermal fissioning of said bred fissile fuel,
   (b) bombarding said particles with neutrons generated by fusion, and adding additional particles of said thermal neutron absorber as the fissile material content of said enrichment section increases to continue to suppress thermal fissioning of said bred fissile fuel,
(c) removing said particles from said blanket after sufficient time that the fuel particles are enriched to about 4%, said time being less than about eight months from the time the generation of neutrons by fusion is commenced,
(d) after said step of removing, mixing said particles to compensate for nonuniformities in enrichment introduced as a function of location of particles within the enrichment section, and
(e) fabricating said particles to form at least one fuel element.

2. A method as set forth in claim 1 wherein said step of fabricating comprises the following substeps:
(a) sintering aggregates of said particles to form pellets, and
(b) inserting aggregates of said pellets into fuel containers to form fuel elements for a fission reactor.

* * * * *

UNITED STATES PATENT AND TRADEMARK OFFICE
CERTIFICATE OF CORRECTION

PATENT NO. : 4,663,110

DATED : 5-5-87

INVENTOR(S) : Edward T. Cheng

It is certified that error appears in the above-identified patent and that said Letters Patent is hereby corrected as shown below:

Column 1, line 14, change "TH" to --Th--.

Column 1, line 29, after "etc" insert a period.

Column 1, line 43, after "element" insert a period.

Column 2, line 38, after "blanket" insert a period.

Column 3, line 57, change "weapons" to --weapon's--.

Column 5, line 40, after "kept" insert --at--.

Column 5, line 53, change "two thirds" to --two-thirds--.

Column 8, line 1, change "materials" to --material--.

Column 8, line 9, change "hyrdraulic" to --hydraulic--.

Column 8, line 65, change "($T^6$)" to --($T_6$)--.

Column 9, lines 19-21, change:

"$4.15 \times 4.17 \times 10^{-4} \quad 4.20 \times 10^{-4}$" to

--$4.15 \times 10^{-4} \quad 4.17 \times 10^{-4} \quad 4.20 \times 10^{-4}$--.

Column 9, line 36, delete "at"

UNITED STATES PATENT AND TRADEMARK OFFICE
CERTIFICATE OF CORRECTION

PATENT NO. : 4,663,110        Page 2 of 2

DATED : 5-5-87

INVENTOR(S) : Edward T. Cheng

It is certified that error appears in the above-identified patent and that said Letters Patent is hereby corrected as shown below:

Column 10, line 16, change "Given a neutron wall loading" to --Given a blanket exposure--.

Column 10, line 43, change "materials" to --material--.

Column 10, line 63, change "maeterial" to --material--.

Signed and Sealed this

Twenty-fifth Day of August, 1987

*Attest:*

DONALD J. QUIGG

*Attesting Officer*      *Commissioner of Patents and Trademarks*